United States Patent
Ju

(10) Patent No.: US 8,698,470 B2
(45) Date of Patent: Apr. 15, 2014

(54) CONTROL FOR SWITCHING BETWEEN PWM AND PFM OPERATION IN A BUCK CONVERTER

(75) Inventor: Shu-Ing Ju, Palo Alto, CA (US)

(73) Assignee: Texas Instruments Incorporated, Dallas, TX (US)

( * ) Notice: Subject to any disclaimer, the term of this patent is extended or adjusted under 35 U.S.C. 154(b) by 265 days.

(21) Appl. No.: 13/037,014

(22) Filed: Feb. 28, 2011

(65) Prior Publication Data

US 2012/0217946 A1 Aug. 30, 2012

(51) Int. Cl.
*H02M 3/156* (2006.01)

(52) U.S. Cl.
USPC .......................................................... 323/284

(58) Field of Classification Search
USPC ................... 323/282, 284, 285, 351
See application file for complete search history.

(56) References Cited

U.S. PATENT DOCUMENTS

| | | | |
|---|---|---|---|
| 5,568,044 A * | 10/1996 | Bittner | 323/272 |
| 7,239,117 B2 | 7/2007 | Lee et al. | |
| 7,382,114 B2 | 6/2008 | Groom | |
| 7,772,818 B2 * | 8/2010 | Smith | 323/282 |
| 2009/0174379 A1 | 7/2009 | Lima et al. | |
| 2010/0327831 A1 * | 12/2010 | Nishida | 323/282 |

FOREIGN PATENT DOCUMENTS

| | | |
|---|---|---|
| WO | WO2006018755 A2 | 2/2006 |
| WO | WO2011005824 A2 | 1/2011 |

* cited by examiner

*Primary Examiner* — Gary L Laxton
(74) *Attorney, Agent, or Firm* — Andrew Viger; Wade J. Brady, III; Frederick J. Telecky, Jr.

(57) ABSTRACT

A buck switching voltage regulator, with high side and low side switching transistors, includes mode control circuitry for switching between PWM and PFM modes based on sensing inductor current through the low side switch during switching cycle OFF times (inductor discharge). Mode switching is based on comparing a an integrated inductor current sense signal with an integrated reference signal corresponding to a predefined average inductor current $I_{AVE}$. In one embodiment, a mode switching condition is based in part on $[I_{VALLEY}=2I_{AVE}-I_{PEAK}]$, where $I_{PEAK}$ is a detected peak inductor current at the beginning of an OFF time, and $I_{VALLEY}$ is an inductor current value determined by $I_{AVE}$ and $I_{PEAK}$.

21 Claims, 8 Drawing Sheets

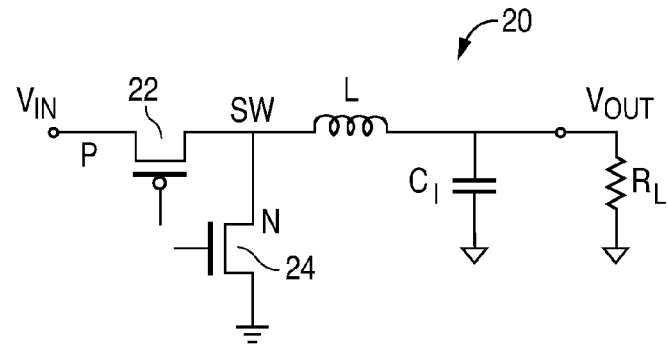
FIG. 1
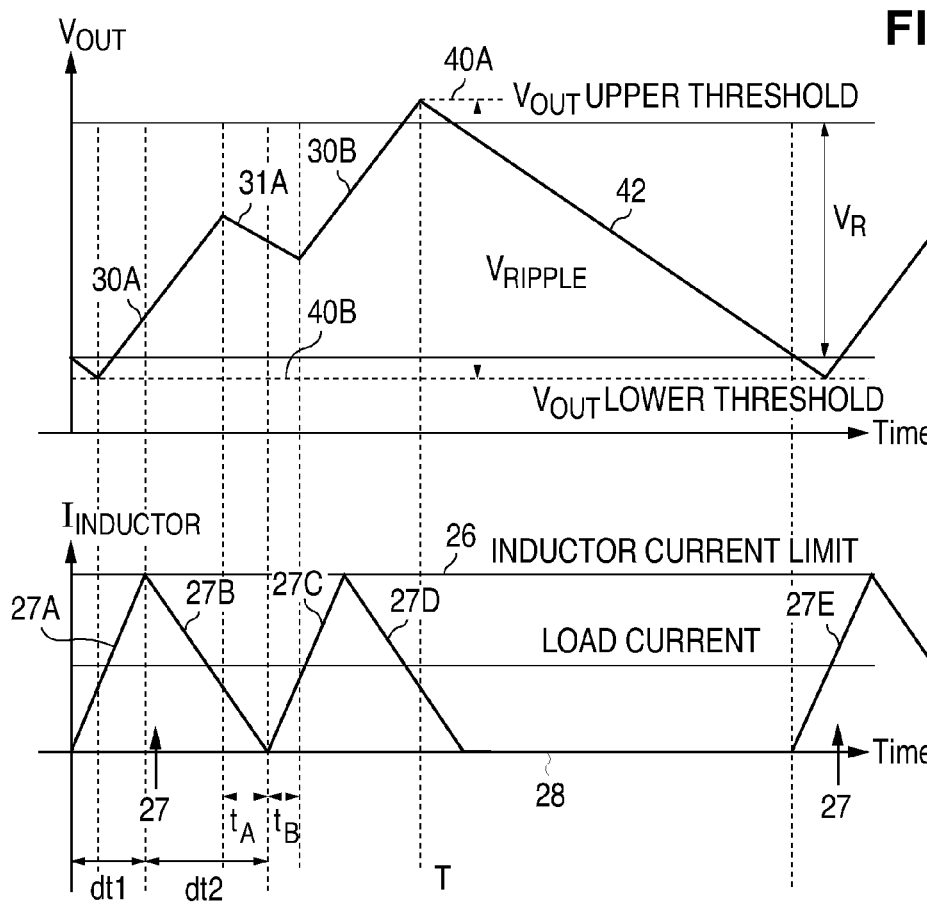
FIG. 3A
FIG. 3B

CONTROL FOR SWITCHING BETWEEN PWM AND PFM OPERATION IN A BUCK CONVERTER

BACKGROUND OF THE INVENTION

1. Field of the Invention

The present invention relates generally to switching voltage regulators and in particular to a control apparatus for accurately controlling switching between a PWM mode and a PFM mode of operation in a multimode buck DC-DC converter.

2. Description of Related Art

Switching voltage regulators are commonly used to provide a regulated voltage source derived from a power source such as a battery. One common type of switching regulator operates as a step down regulator (buck converter) that provides a voltage output which is smaller than the input voltage utilizing pulse width modulation (PWM). FIG. 1 is a simplified diagram of a conventional buck converter, with the control circuitry not being depicted. An inductor L is provided having one terminal connected to the regulated output voltage Vout node. The other terminal of the inductor is connected to the input voltage node Vin by way of a P type transistor switch 22, some times referred to as the high side transistor. The same inductor terminal is connected to ground by way of an N type transistor switch 24, sometimes referred to as the low side transistor. Switches 22 and 24 are driven in opposite phases, with there being a small overlapping OFF period so that Vin in never connected directly to ground through the two switches. The PWM operates at a fixed frequency.

The control circuitry controls the states of P type transistor switch 22 and N type transistors switch 24 to provide a regulated output voltage Vout. The inductor L current is depicted in the timing diagram of FIG. 2. The average inductor current is the same as the load current. As can be seen in the diagram, the load current is such that a DC current flows in inductor L into the load. During an initial switching period T0 to T1, P type transistor 22 is turned ON, while N type transistor 24 is held OFF. During this time period, the voltage across the inductor L is relatively fixed at Vin−Vout. This will cause the inductor current to increase, with the slope of the increasing current equal to (Vin−Vout)/L. This charging current is provided to the filter capacitor C1 and the load represented by RL. Assuming that a voltage-mode architecture is being used, the inductor current will increase until it reaches a peak maximum value $I_{PEAK}$ at time T1.

At this peak current point, a comparator in the control circuitry will trip causing the P type transistor to turn OFF and, after a short overlap period, cause the N type transistor 24 to turn ON. The voltage across the inductor L is now about Vout, with the polarity being such that the inductor L current proceeds to decrease, with capacitor C1 providing the discharge current. The slope of the discharge current from T1 to T2 is −Vout/L. At time T2, the end of one switching cycle, transistor 24 is turned OFF. Given that the load current is assumed to remain relatively constant over a given switching period, the inductor current at the end of a switching cycle T2 is the same as at the beginning of the cycle at T0. This switching is repeated for each successive switching cycle.

The output voltage Vout is regulated by modulating the ON time of transistor 22 (T0 to T2; T2 to T4, etc.) during each fixed duration switching cycle. Thus, if the output voltage Vout should drop due to an increase in load current, the duration of the transistor 22 ON time is increased. Similarly, if Vout should increase due to a drop in load current, the duty cycle of transistor 22 will be reduced.

The average load current is equal to the average inductor L current $I_{AVE}$. The average inductor current $I_{AVE}$ can be expressed, based upon an inspection of FIG. 2, as follows:

$$I_{AVE} = I_{DC} + (I_{PEAK} - I_{DC})/2 \quad (1)$$

When the DC load current $I_{DC}$ approaches zero, equation (1) is reduced to the following:

$$I_{AVE} = I_{PEAK}/2 \quad (2)$$

Note that N type transistor 24 could be replaced with a simple diode, with the diode becoming forward biased during the discharge of the inductor. However, transistor 24 is implemented using a relatively large device so that the transistor ON resistance is lower than that of a forward biased diode. Thus, under most operating conductions, power consumption is reduced.

Note that if the load current is further reduced from that represented by equation (2), the inductor L will momentarily stop conducting current. In this event, operation switches from what is termed continuous mode operation to discontinuous mode operation. For even lower load currents, it is possible that the inductor current flow will actually reverse direction, with current being pulled from the filter capacitor/load. Since discontinuous mode operation and reverse inductor current can be undesirable in some circumstances, it is possible to avoid this conduction by proper selection of the size of the inductor L and specifying a minimum load current. In order to avoid reverse inductor current flow it is possible to employ a zero inductor current detector which turns transistor 24 OFF just before current in the inductor begins to reverse. The transistor remains OFF during the remainder of the switching cycle at which point transistor 22 is again turned ON.

The above described PWM is relatively efficient, particularly at high and mid-range load current levels. For a typical buck synchronous converter, power loses that can reduce efficiency can be grouped as AC and DC loses, DC loses are determined mainly by the ON resistance of the switching transistor 22 and 24 and by the series resistance of the inductor L. The AC loses, which are proportional to the regulator switching frequency, are primarily due to switching loses and transistor 22 and 24 gate drive loses.

At heavy loads, DC loses predominate so lowering the transistor ON resistances and the inductor resistances are effective in increasing efficiency. However, at light loads, AC loses predominate so that decreasing the switching frequency improves efficiency. As noted above, at low load currents there is a tendency for the inductor current to reverse, which will decrease efficiency so that a zero inductor current detector may be more useful that at high load currents.

It can be seen from the above, that a PWM converter optimized for mid and high load current may not be very efficient at lower load currents. Thus, if a converter is to operate efficiently over a relatively wide range of load currents, including low load currents, some PWM converters utilize multiple operating modes including Pulse Frequency Modulation (PFM). As will be described, PFM is inherently more efficient at low load currents so that efficiency can be increased by switching between PWM and PFM depending upon the load current.

Referring again to the regulator of FIG. 1, PFM is similar to PWM in the sense that transistor 22 can be used to produce a series of inductor current pulses which are applied to the filter capacitor C1 and load R1. However, the frequency of the pulses in not fixed but rather is varied in order to maintain a regulated output voltage between and upper regulated output voltage level 40A and a lower regulated output voltage 406.

The difference between the two regulated voltages depends upon the required accuracy but it is typically less than 1% of Vout. FIGS. 3A/6 and FIG. 4 are timing diagrams that depict operation of what is termed hysteretic PFM. As shown in FIG. 3B, the control circuit (not depicted) operates based upon a maximum peak inductor current level 26 and a minimum (zero) inductor current level 27. The PFM controller initially turns P type transistor 22 ON, with transistor 24 again being held OFF. This causes the inductor current, generally designated by the numeral 27 to increase, starting at zero current with the slope at 27A again being fixed at about (Vout−Vin)/L. At the point the regulated output voltage Vout is located intermediate an upper threshold regulated voltage 40A (FIG. 3A) and a lower threshold regulated voltage 40B, in this case near the lower threshold. This current pulse will cause the output voltage Vout to begin to increase after some delay due to various factors including filter capacitor C1. The magnitude of the voltage increase is related to the load current. This voltage increase is represented by line 30A in FIG. 3A and line 30A in FIG. 4. At this point, the output voltage has not year reached the upper regulated limit 40A.

The inductor current wifi increase over time dt1 to some predetermined upper current limit as indicated by line 26 of FIG. 3B. After the current limit has been reached, transistor 22 is turned OFF followed by transistor 24 turning ON. As indicated by FIG. 3B this will cause the inductor current to drop, with the slope again being about Vout/L. This results in an eventual small drop in the regulated output voltage 31A as shown in FIG. 3A, with the size of the drop being again determined by the size of the load current. A zero inductor current detector will trigger when the inductor current reaches zero indicated by line 28 at the end of the dt2, with this causing transistor 24 to turn OFF followed by transistor 22 turning ON.

The inductor current will then again increase as indicated by 27C of FIG. 3B until the maximum value 26 is reached. In the example of FIG. 3A, this additional current pulse will cause the output voltage to increase to the upper output voltage Vout threshold voltage 40A. In the example of FIG. 4, this additional current pulse is insufficient to increase the output voltage Vout to the upper threshold 40A so that additional current pulses are required which produce additional voltage increases 30C and 30D. At this point, the current pulses supplied by inductor L operate to increase Vout to the upper output voltage Vout threshold. No further current pulses are applied, as indicated by FIG. 3B, since they would cause Vout to go too high. At this point, both drive transistors 22 and 24 are held OFF so that the load current is provided solely by the filter capacitor C1.

The output voltage Vout will begin to drop as capacitor C1 is discharged by the load as indicated by region 42 of the waveform of FIG. 3A. Eventually the output voltage Vout will drop to the lower threshold voltage 40B, at which time additional current pulses are provided as indicated by FIG. 3B thereby causing Vout to increase to the upper threshold voltage 40A. Note that for normal PFM operation at low load currents, inductor current pulses are regularly skipped. A continuous production of inductor current pulses in PFM operation indicates that converter is providing a maximum output current in that mode.

At low load currents, PFM can provide substantially increased efficiency as compared to PWM for the same current output. That is particularly true of the PWM operation has been optimized for efficient mid and high load current operation. By way of example, in the case of PFM operation, no switching losses are present during the dead time 42 previously described. As a further example, because of the zero inductor current detection, transistor 21 can be turned ON with no inductor current present thereby eliminating turn-on losses. Further, the size of the runs ripple current for PWM can vary considerably since it is related to the difference between Vin and Vout, with PFM operation resulting in lower rms inductor currents and thus lower ac inductor losses.

In view of the foregoing, buck converters have been produced having the capability of operating in a PWM mode for mid and high load currents and PFM for low load currents. These converters include provisions for switching between modes based upon the level of the load currents. In some cases the input voltage Vin is further taken in consideration, since PWM efficiency generally decreases as input voltage decreases. Thus, to maximize efficiency, for smaller input voltages it is usually desirable to switch from PWM to PFM at lower load currents. In some applications, the size of the output voltage trout is taken into account with PFM being generally preferred for low output voltage operation.

One prior art approach for switching between PWM and PFM is to monitor the inductor L current flow though P type switching transistor 22, along with monitoring the input voltage Vin magnitude. Since the inductor current provides some indication of the load current, mode switching circuitry operates to switch to PFM operation at low load currents and PWM operation at mid to high load currents. Typically, the maximum operating load current for PFM operation is specified by setting the maximum inductor current Ipeak indicated by line 26 of FIG. 3B. Since the average load current is equal to the average inductor current, the maximum load current for PFM operation is Ipeak/2 assuming that no current pulses are being skipped. If the PFM control circuit causes N number of consecutive current pulses to be produced, where N is typically 32, the converter is considered operating at the specified maximum output current for PFM operation. Thus, the mode control circuitry will cause the converter to switch to PWM. Similarly, when in the mid and high current PWM mode, should the load current drop below a value equal to Ipeak/2, the mode control circuitry will switch to PFM. Thus, increased efficiency is achieved over a wide range of load currents.

It has been found that the above-described approach sometimes results in improper switching between operating modes. By way of example, sometimes the mode control circuitry will detect what is perceived to be low load current conditions and switch from the PWM mode to the PFM mode. While in the PFM mode, this same perceived load current will indicate that the current is sufficiently high to warrant immediately switching back to the PWM. This improper shifting between operating modes under certain operating conditions is obviously undesirable. There is a need for mode control circuitry which is capable of measuring load currents with sufficient accuracy in both the PWM and PFM operation so that this inappropriate shifting between operating modes is either eliminated or substantially reduced. As will become apparent from a reading of the following Detailed Description of the invention together with the drawings, the present invention addresses these and other shortcomings of the prior art.

BRIEF DESCRIPTION OF THE DRAWINGS

FIG. 1 is a schematic diagram of a prior art inductor and related drive transistors for use in a buck switching regulator.

FIGS. 3A and 3B are timing diagrams of the inductor current and output voltage of a prior art switching regulator using pulse frequency modulation (PFM).

DETAILED DESCRIPTION OF THE INVENTION

Figure 5:
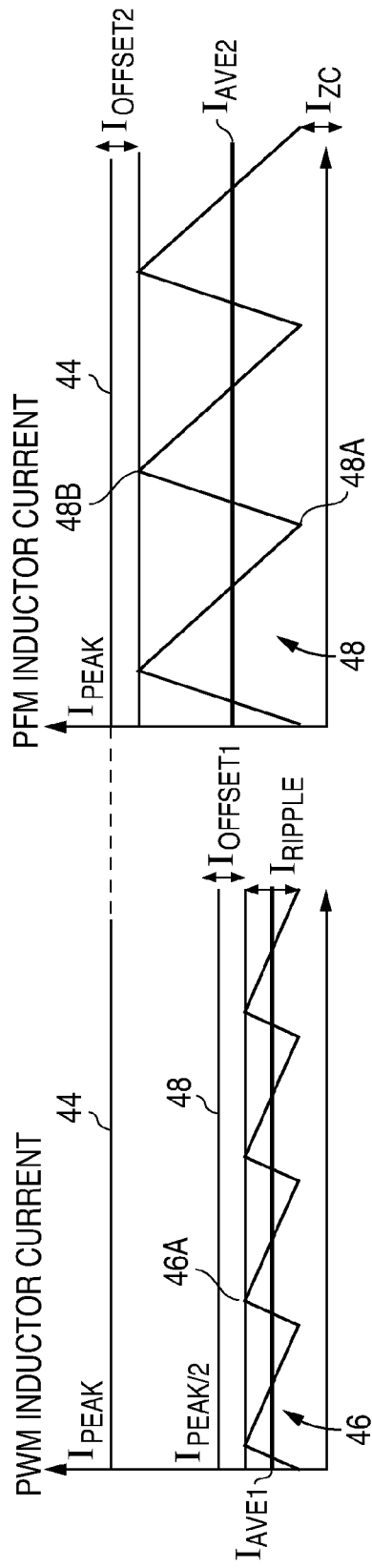
FIGS. 5A and 5B are timing diagrams of a prior art switching regulator in the respective PWM and PFM operating mode illustrating sources of error in conventional average current measurements.

Referring again to the drawings, FIGS. 5A and 5B further illustrate the operation of prior art mode control circuitry based upon perceived measurements of the average load current. As previously noted, the specified load current level for switching from PFM to PWM operation is determined by selection of the peak inductor current 26 depicted in FIG. 3B. However, in either mode, a peak current detector current measurement of Ipeak/2 does not reflect the actual average load current.

FIG. 5A shows an exemplary inductor current waveform 46 during PWM operation. Current level Ipeak, as previously noted, is specified in connection with PFM operation, and is used by the mode control circuitry for switching between the two operating modes. Ideally, when the average inductor current in the PFM mode has increased to Ipeak/2, the mode will change to PWM and, conversely, when the average inductor current has dropped to Ipeak/2 in PWM, the mode will change to PFM. Inspection of waveform 46 indicates that the actual average inductor current is Iave1, with this value being located halfway between the peak-to-peak ripple current, and including any DC component.

In normal PWM operation Iave1 is greater than Ipeak/2, with switching from PWM to PFM occurring when Iave1 has dropped down in value to Ipeak/2. Ideally, the mode switching point when in the PWM mode, referred to as Ims1, is equal to Ipeak/2. However, the peak current sensor of the mode control circuitry is only capable of detecting the peak current 46A of the inductor current, with the value differing substantially from the actual average current Iave1. By relying upon peak detection, there are two primary sources of error. First, peak detection does not take into account the peak-to-peak ripple current Iripple. Second, the peak detection circuit has an input offset and a finite response time. Thus, assuming a worst case polarity in the input offset voltage, the comparator may not trip until some time after the current has exceeded the peak current point represented, by way of example, by peak 46A. This error is designated Ioffset1. Taking these two errors into account, the current waveforms depicted FIG. 5A show the mode switching point Ims1 in not Ipeak/2 but rather is, as follows:

$$Ims1(PWM\Rightarrow PFM)=Ipeak/2-Ioffset1Iripple/2 \quad (3)$$

Thus, the switching point is well below the ideal point of Ipeak/2, so that that the converter will remain operating in the PWM at current levels that are too small. Since the PWM circuitry is not optimized for operation at this low a current, efficiency suffers.

FIG. 5B shows the current waveforms when operating in the PFM mode. The actual inductor current waveform 18 indicates that the average current is Iave2, with value falling midway between the current peaks 48A and 48B. As previously noted, when in the PFM mode when the load current is well below the transition point to PWM, inductor current pulses are regularly skipped. However, the PFM control circuitry, which includes zero inductor current detection circuitry, may turn N type transistor 24 OFF too early or may turn P type transistor 22 ON too early. In that case, the negative current peak, such as peak 48A, does not actually reach zero current but remains above zero. This error is designated as Izc. Similarly, the peak current detector may turn P type transistor 22 OFF too early or may turn N type transistor 24 ON too early so that the inductor current positive peak, such as peak 48B, never reaches the specified Ipeak value. This error is represented by value Ioffset2. The depicted polarities of the Izc and Ioffset2 are assumed to be in a worst case direction. In any event, these errors operate to reduce or increase the current load capability in the PFM mode from Iave2, which should be Ipeak/2, to a smaller or bigger value. This results in the average current mode switching point from PFM to PWM being less or greater than the ideal value of Ipeak/2. Instead, the switching point value, Isme2, is as follows:

$$Ism2(PFM\Rightarrow PWM)=Ipeak/2-Ioffset2+Izc \quad (4)$$

Ideally, there should be a fixed controllable difference between Ism1 and Ism2 to provide some hysteresis in the switching between the PFM and PWM modes. By way of example, if the value of Ism1 90 mA and the value of Ism2 is 100 mA, the converter will switch to PFM at 90 mA and will not switch back unless the current has increased slightly to 100 mA. However, based upon equations (3) and (4), the actual difference between the two switching points is than as follows:

$$Ism2-Ism1=-Ioffset2+Ioffset1+Izc+Iripple/2 \quad (5)$$

None of the components of equation (5) are well defined and cannot be well controlled. Ioffset1 does not track Ioffset2, This is particularly true of the Tripple/2 term which can vary widely depending upon the PWM switching frequency and the duty cycle. In addition, variations in Izc can be large. Thus, there is no fixed and well controlled hysteresis value so that inappropriate cycling between modes is very likely.

In order to provide a more reliable indicator of average inductor current for purposes of mode switching, one aspect of the present invention is to monitor the inductor discharge current rather than the charge current. This is accomplished by sensing the inductor current through low side transistor 24 (FIG. 1) rather than the high side transistor 22. Operation in the PWM mode is first described.

Figure 2:
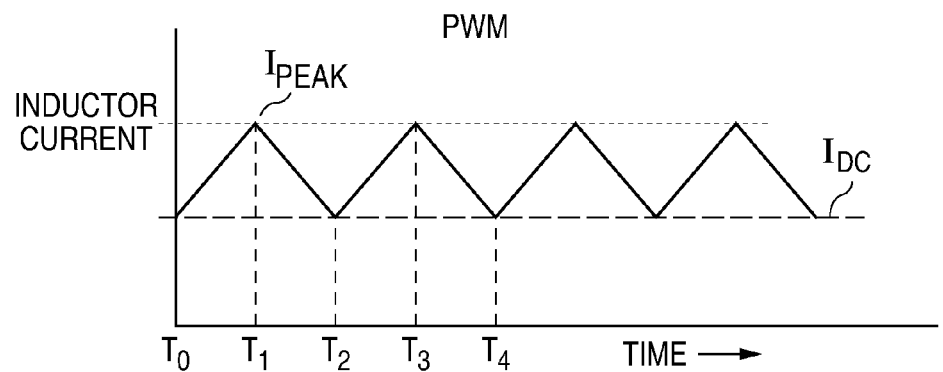
FIG. 2 is a timing diagram of the inductor current of a prior art switching regulator using pulse width modulation (PWM).
Figure 6:
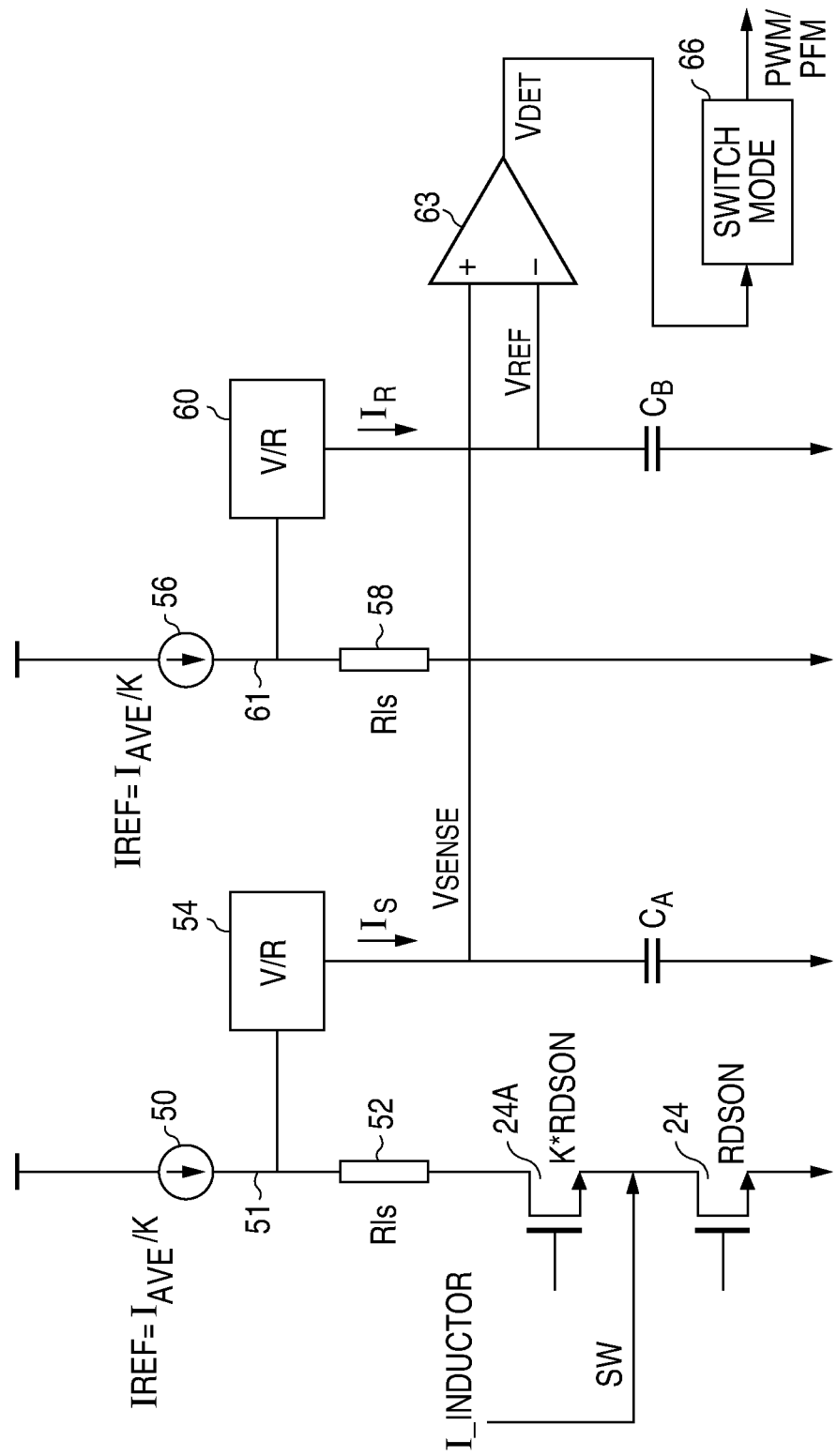
FIG. 6 is a schematic diagram of one embodiment of the subject mode control circuit which includes inductor current sensing circuitry.

Referring to FIG. 6, a simplified schematic circuit diagram of one embodiment of the present invention is depicted. Many details regarding the implementation of the circuit would be well known to those skilled in the art and will not be provided so as to avoid obscuring the nature of this embodiment of the present invention in unnecessary detail. The low side switching transistor 24 is shown connected between node SW (see FIG. 1) and the circuit common. The FIG. 6 circuit is operative only during those periods of the switching cycle where the low side transistor 24 is conducting and hence the high side transistor is OFF and is thus not depicted. As previously described, when the high side transistor is turned OFF, the inductor L current has reached a peak value as shown in FIG. 2 at time T1. Shortly after the high side transistor is switched OFF, low side transistor 24 is turned ON. Since inductor L will tend to continue conducting this peak current, the inductor terminal connected to node SW will go negative in voltage, with the magnitude of this negative voltage being equal to the product of the peak inductor current and the ON resistance of transistor 24 referred to as Rdson.

The voltage across the Rdson of transistor 24 is indicative of the inductor L current during the period that transistor 24 is conductive. In that the voltage at node SW is negative, voltage offset circuitry is provided which adds an offset voltage to node SW so that circuitry utilizing only a positive supply voltage can be utilized to measure the inductor current. That circuitry includes a transistor 24A and a fixed resistance Rls provided by a resistor 52 and an associated current source 50 that provides a fixed current source Iref. Transistor 24A is a P type device which is driven by the same signal driving the low side transistor 24 and having an ON resistance that is larger than that of transistor 24 by a fixed factor of K where K=Iave/Iref, The constant K has a typical value of at least 1000 so that Iref is only a small fraction of Iave. One approach to providing this ratio of ON resistances is to fabricate several N type related devices at the same time and to use only a few of those devices to form transistor 24A and to connect several of the remaining devices in parallel to form transistor 24, with the number of parallel devices being related to the value K. The fixed current Iref value is determined by a specified current value Iave based upon the target current level at which the converter is to switch between the PWM and PFM operating modes (ignoring a small fixed hysteresis current to be described later). Thus, if in the PWM mode and the measured inductor current drops below Iave, the mode switches to the PFM mode. Conversely, if the current in the PFM mode is greater than Iave for a given period of time, the mode switches to PWM.

The actual value of Iref is set to Iave/K as noted above, with K being the previously noted ratio of the ON resistance of transistor 24A to low side transistor 24 ON resistance. The Iref current flow through transistor 24A produces an offset voltage equal to Rdson×Iave which is fixed for a given value of Rdson. This voltage translates the negative voltage on node SW to a positive voltage on the drain of transistor 24A. The size of this translating voltage is sufficient to translate the negative voltage on node SW to a positive voltage but is not too large (thereby wasting voltage headroom) since the translating voltage depends upon the ON resistance of transistor 24 and the average inductor current flow through transistor 24.

In order to translate the voltage at the drain of transistor 24A even further so as to provide a fixed increase in additional voltage headroom, a resistor Rls 52 is connected in series with transistor 24A to provide a fixed translated voltage at node 51 which is added to the voltage at the drain of transistor 24A. The voltage at node 51 is related to the voltage at node SW and differs by the fixed voltage drops across resistor 52 and transistor 24A. The voltage at node 51 is converted back to a current value Isense by way of V/R converter 51. V/R 54 can be a voltage to current converter implemented using a unity gain amplifier with a resistive load. As will be explained later, current Isense is integrated over a period of time starting when low side transistor 24 is first turned ON to provide an average inductor current value. Should that average inductor current value drop to the specified mode switching value of Iave for more than a number of switching cycles, the converter switches to the PFM mode.

Figure 7:
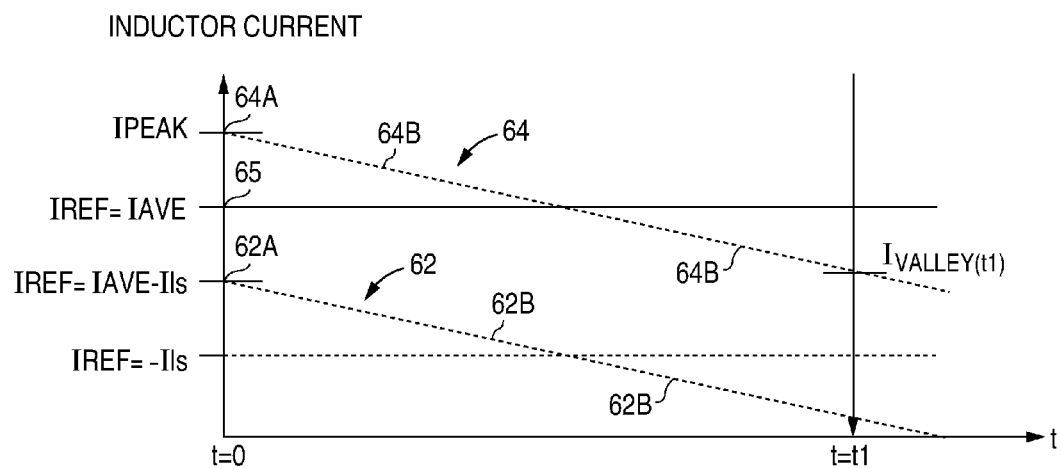
FIG. 7 is a timing diagram illustrating operation of the mode control circuitry of FIG. 6.

FIG. 7 shows is a timing diagram showing representations of the inductor current when the low side transistor 24 is first turned ON at t=0 seconds. The actual inductor current starts at a peak value at t=0 seconds at point 62A and drops linearly over time as indicated by waveform section 62B as the inductor discharges. The measured inductor current based upon the voltage at node 51 (FIG. 6) is shifted to a negative inductor current from the actual current due to the offsetting voltages provided by resistor 52 and transistor 24A. This measured current is represented by waveform 64 of FIG. 7, and includes a peak value Ipeak at time t=0 at point 64A and drops linearly over time as indicated by waveform section 64B. Thus, in order to arrive at the actual inductor current, it is necessary to subtract the current values associated the two translating voltage drops, with this function being carried out by the V/R converter 54. Since the voltage across transistor 24A is the product of the specified average current Iave and resistance Rdson, the current value associated with this voltage is Iave. The current value associated with the fixed voltage drop across resistor 52 is referred to herein as Ils which stands for current level shift.

By definition, the average inductor current during the inductor discharge period from time T1 (FIGS. 2) to T2 for example, is equal to the difference between the peak value at T1 and the minimum value at T2 divided by 2. Solving for the minimum value, this can be expressed with reference to FIG. 7 as follows:

$$I\text{valley}(t) = 2I\text{ave} - I\text{peak} \quad (6)$$

where Ivalley is the current value at time t;
Iave is the specified average current value for mode switching and
Ipeak it the peak current value at t=0.

Should the inductor current reach and then drop below the value of 2Iave−Ipeak per equation (6) during the low side transistor 24 ON period for each of some predetermined number of consecutive switching cycles, the current will have dropped below the specified value of Iave in which case the operating mode should switch to PFM. If the inductor current never reaches this value, then the converter should remain in the PWM mode.

The voltage-to-current converter (V/R) 54 operates to convert the voltage V51(t) at node 51 of FIG. 6 to an equivalent current Is(t) as follows:

$$Is(t) = V51(t)/R \quad (7)$$

where R is the conversion factor.
From inspection of FIG. 6, voltage V51(t) is as follows:

$$V51(t) = -V24(t) + V24A(t) + V52(t) \quad (8)$$

where
V24(t)=Iinductor(t)*Rdson (the voltage across transistor 24 produced by the inductor current Iinductor and ignoring the relatively small voltage drop due to current Iref.)
V24A(t)=(Iave/K)(K*Rdson) (the voltage drop across transistor 24A; and
V52(t)=(Iave/K)Ris (the voltage across resistor 52.
Substituting the above values for V24(t), V24A(t) and V52(t) into equation (8), the value of Is(t) of equation (7) is as follows:

$$Is(t) = [I(0) + I(t)]/2 \quad (9)$$

where
I(0) it the peak inductor current at the beginning of the discharge period indicated by point 62A of FIG. 7; and
I(t) is the drop in inductor current over time as the inductor is discharged.

The value of R used in connection with the voltage-to-current converter 54 is set to Rdson/m, where m is a constant so that Rdson/R=m. Thus, in referring to the timing diagram of FIG. 7, the peak inductor current I(0) of equation (9) at the beginning of the discharge period is as follows:

$$I(0)=-mI\text{inductor}(0)+Ils+mI\text{ave}$$

or $$I(0)=-(mI\text{peak}-Ils+mI\text{ave}) \quad (10)$$

where
   Ipeak is the peak inductor current at t=0 (point 64A of FIG. 7),
   Iave is the specified average current for mode switching (64A to 65 of FIG. 7) and
   Ils is the fixed offset current (65 to 62A of FIG. 7).

Current I(t) of equation (9) can be expressed as follows, again in reference to the FIG. 7 timing diagram:

$$I(t)=-(mI\text{valley}(t)-mI\text{ave}-Ils) \quad (11)$$

where
   Ivalley(t) is the inductor discharge current (64B of FIG. 7) and Iave and Ils were previously defined in connection with equation (10).

Current Is(t) of equation (9) is used to charge a capacitor $C_A$ over time to produce an integrated sense voltage Vsense. Voltage Vsense can be expressed as follows:

$$V\text{sense}=(1/C_A)(t)[I(0)+I(t)]/2 \quad (12)$$

Substituting equations (8) and (9) into equation (12), the following results:

$$V\text{sense}=(1/C_A)(t)(-mI\text{peak}+mI\text{ave}+Ils-mI\text{valley}(t)+mI\text{ave}+Ils)/2 \quad (13)$$

Replacing Ivalley(t) with 2Iave−Ipeak per equation (6), equation (13) reduces Vsense to the following:

$$V\text{sense}=(1/C_A)(t)(Ils) \quad (14)$$

Thus, should Vsense drop to the value shown in equation (14) at any point during the low side transistor 24 conduction period, the average inductor current has dropped down to the specified Iave value and switching to the PFM mode is appropriate if this occurs for a number of consecutive switching cycles.

Circuitry if provided to determine if the condition of equation (14) exists. The same reference current value Iref 50 used in the inductor sensing circuit is also used in a reference circuit, with this current being provided by current source 56. The current is passed through a resistance 58 equal in magnitude to resistor 52 of the sense circuitry. A voltage-to-current converter 60 produces a current Ir related to the voltage V61 at node 61. Current Ir is equal to Ils, with Ils being the same as produced in connection with the sense circuitry as described in connection with equation (14). Current Ir can be expressed as follows:

$$Ir=V61/R$$

substituting (Iave/K)Rls for V61, $$Ir=(I\text{ave}/K)(Rls)/R \quad (15)$$

Current Ir is connected to charge a capacitor $C_B$ having a capacitance equal to capacitor $C_A$. Thus, current Ir of equation (15) is integrated over time to produce the following voltage Vref as follows:

$$V\text{ref}=(1/C_B)(t)(Ils) \quad (16)$$

A comparator 63 compares voltages Vref and Vsense of equations (16) and (14) and, based upon the comparison, can produce a signal Vdet indicating a potential mode change. Comparator 63 can be implemented as a differential amplifier followed by a high gain amplification stage. The output of comparator 63 is connected to a switch mode circuit 66 which, depending upon various factors including Vdet, will signal that a switch from PWM to PFM is appropriate or a switch from PFM to PWM is appropriate. During the beginning of the ON period for low side transistor 24 (see FIG. 6) at t=0 sec, voltage Vref is greater than Vsense indicating that the average inductor current is greater than the specified switching point Iave. As time passes up to time t=t1, Vsense has dropped down to Vref in magnitude so the comparator output Vdet changes to a high state indicating that average inductor current is equal or less than Iave so that a mode change may be appropriate. If voltage Vsense never reaches Vref during the transistor 24 ON time, output Vdet is never produced indicating that the inductor current is sufficiently high so that no mode change is appropriate.

Figure 8:
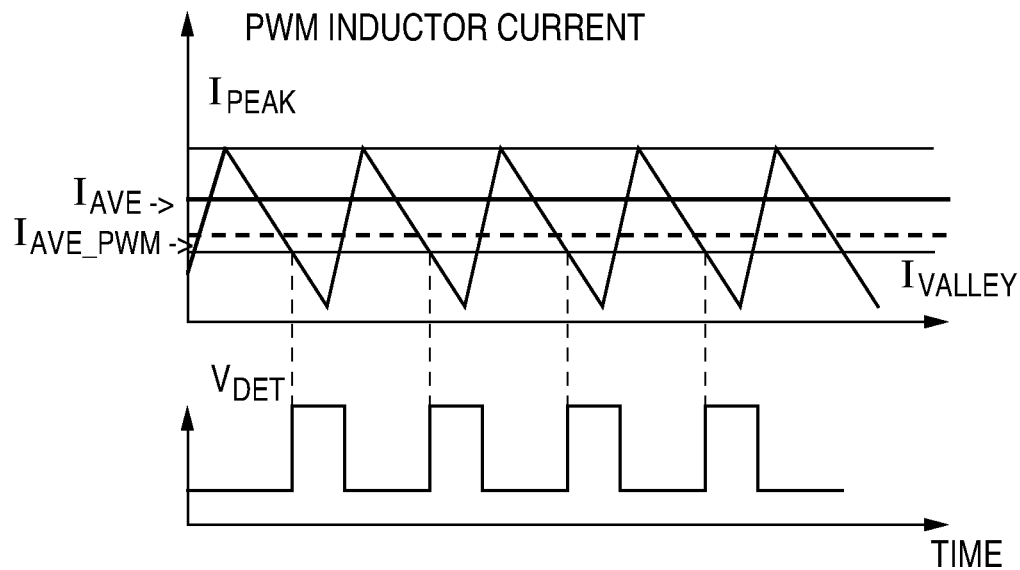
FIG. 8 is a timing diagram illustrating the operation of the mode control circuitry when in the PWM mode.

Operation in the PWM mode is further illustrated by the timing diagrams of FIG. 5A and FIG. 8. Each time Ivalley is equal to (2Iave−Ipeak) per equation (6) above, signal Vdet is produced.

Assuming that the converter is operating in the PFM mode, operation of the FIG. 6 circuit is substantially the same. The converter is providing a maximum output current if no current pulses are skipped, with this condition indicating that it is appropriate to switch to PWM operation. The converter in the PFM mode is implemented to provide an average inductor current equal to the specified average current Iave when a current pulse is produced as depicted in FIG. 3B. Thus, at the end of each current pulse, the value of the sense voltage Vsense will slightly exceed Vref thereby producing an output Vdet. Thus, when the current sensing circuit of FIG. 6 produces a consecutive number of Vdet pulses, it is appropriate to switch to the PWM mode.

As previously noted, the average sensed current level for switching from PWM to PFM should be slightly lower than the current level for switching from PFM back to PWM. In that the subject inductor sensing circuitry provides a relatively precise measurement of average inductor current, this hysteresis current can also well controlled so that inappropriate switching between operating modes is avoided. A preferred approach to providing this hysteresis is to utilize a slightly smaller value of K for PWM than for PFM. This will require that the structure of transistor 24A be modified for PWM operation so that the ON resistance of transistor 24A (K*Rdson) will be decreased. Transistor 24A can be modified for PWM operation by electrically switching in one or more small parallel transistor structures to a main structure and then, for PFM operation, switching the structures back out.

Figure 9:
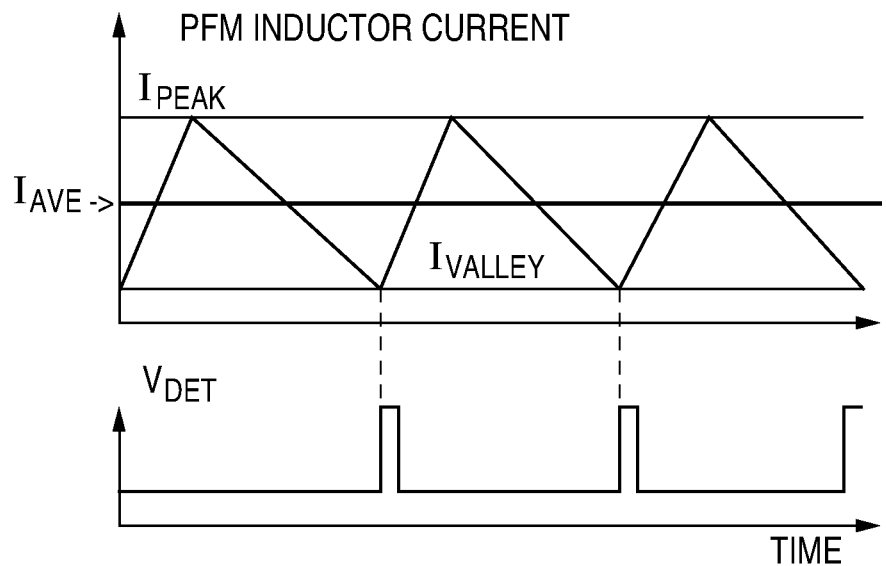
FIG. 9 is a timing diagram illustrating the operation of the mode control circuitry when in the PFM mode.

Operation in the PFM mode is further illustrated in the timing diagram of FIG. 9. The inductor current is averaged (integrated) starting at the beginning of the inductor discharge period until the average value matches Iave. At that time, a Vdet output is produced. The average measurement is relatively independent of the absolute value of Ipeak which can vary due to comparator induced offsets. Once again, after a predetermined number of Vdet outputs, as determined by the switch mode circuitry 66, the converter will shift to PWM operation.

Figure 10A:
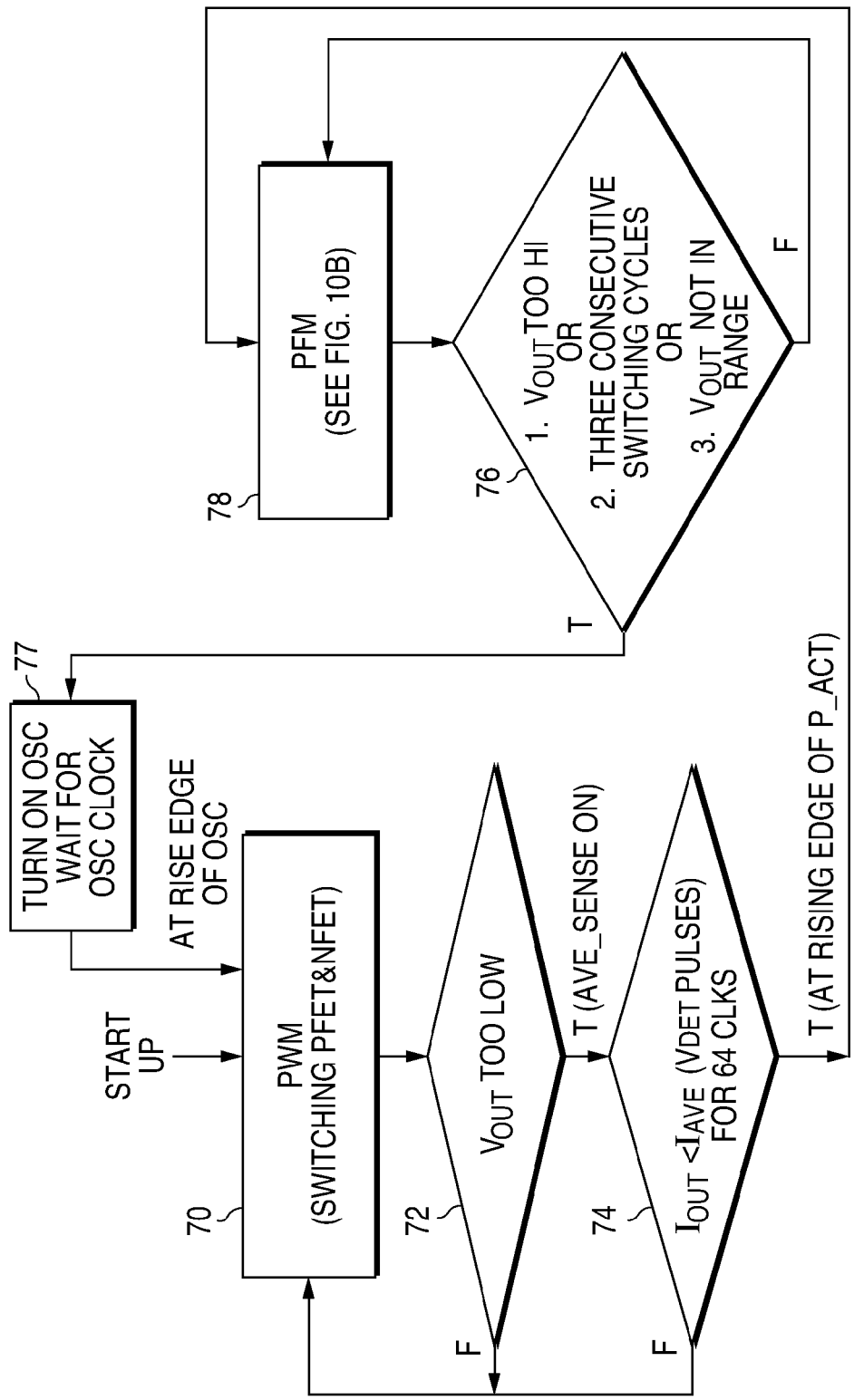
FIGS. 10A and 10B are flow charts showing exemplary sequences for switching between PWM and PFM modes.
Figure 10B:
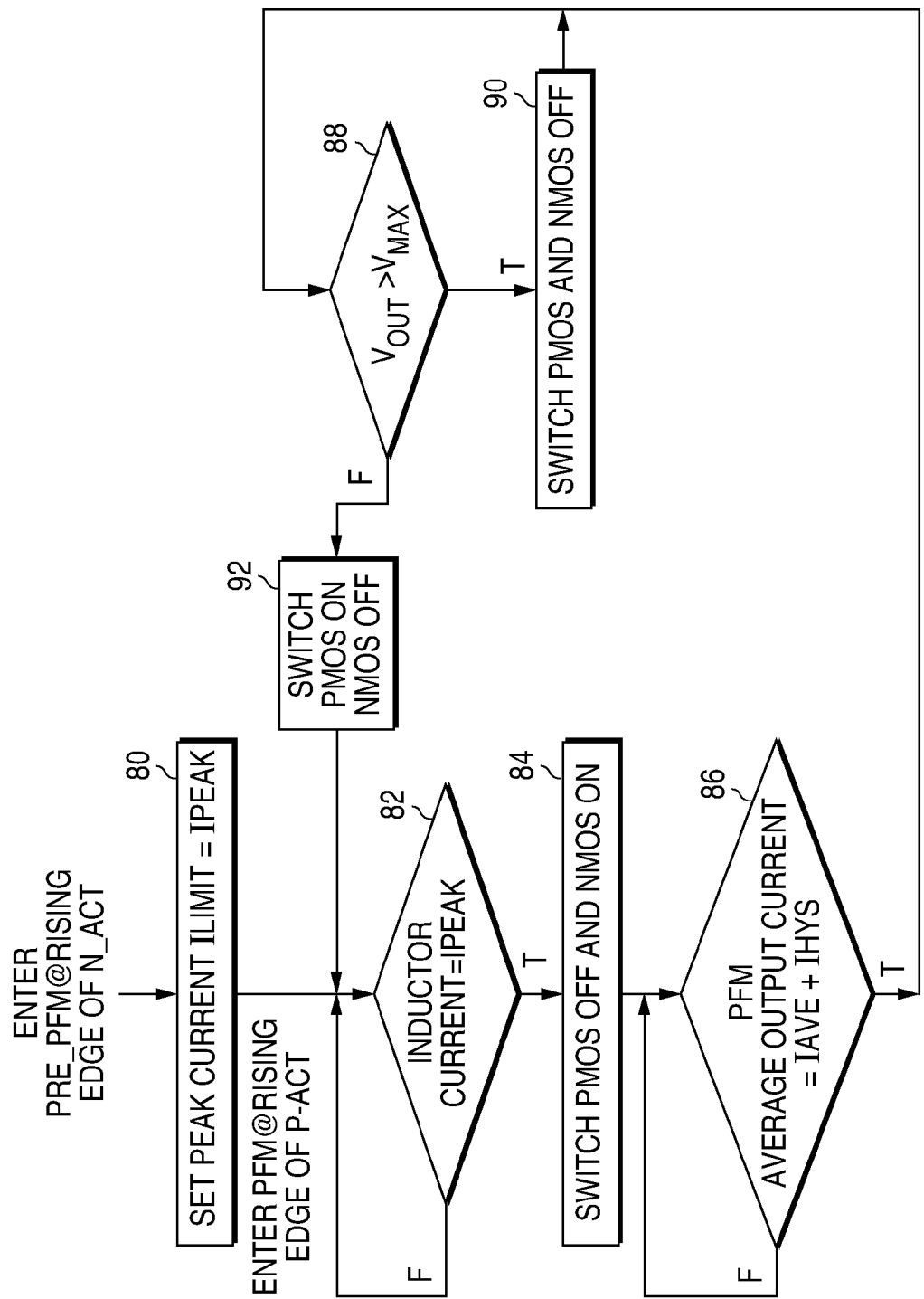

FIGS. 10A and 10B are flow charts showing further details regarding the mode transitions between the PWM and PFM operating modes. As start up, the converter is in the PWM mode (block 70). One indication of that the converter should probably switch to the PFM mode is that the actual output voltage Vout is below some the output voltage target value Vt. The output voltage target value is as follows:

$$Vt=V\text{con}(G) \quad (17)$$

where Vcon is the value of a voltage reference internal to the converter and
G is the gain of the converter usually set by a resistive voltage divider.

If the output voltage Vout is below the target output voltage Vt, this is an indication in this instance that the load current is too low. As indicated be element 72 of the flow chart, if this low voltage condition exists, the PFM is preferred over PWM. Assuming that the voltage is low, the inductor current sensing circuitry is turned ON. If the average current is too low, a Vdet pulse is produced. If a predetermined number of consecutive pulses are produced, the converter should begin to switch to PFM at the rising edge of the high side P type transistor 22 (element 74). The switch mode circuitry 66 (FIG. 6) operates to provide the switching mode signal PWM/PFM signal upon receipt of the requisite number of Vdet pulses.

Figure 4:
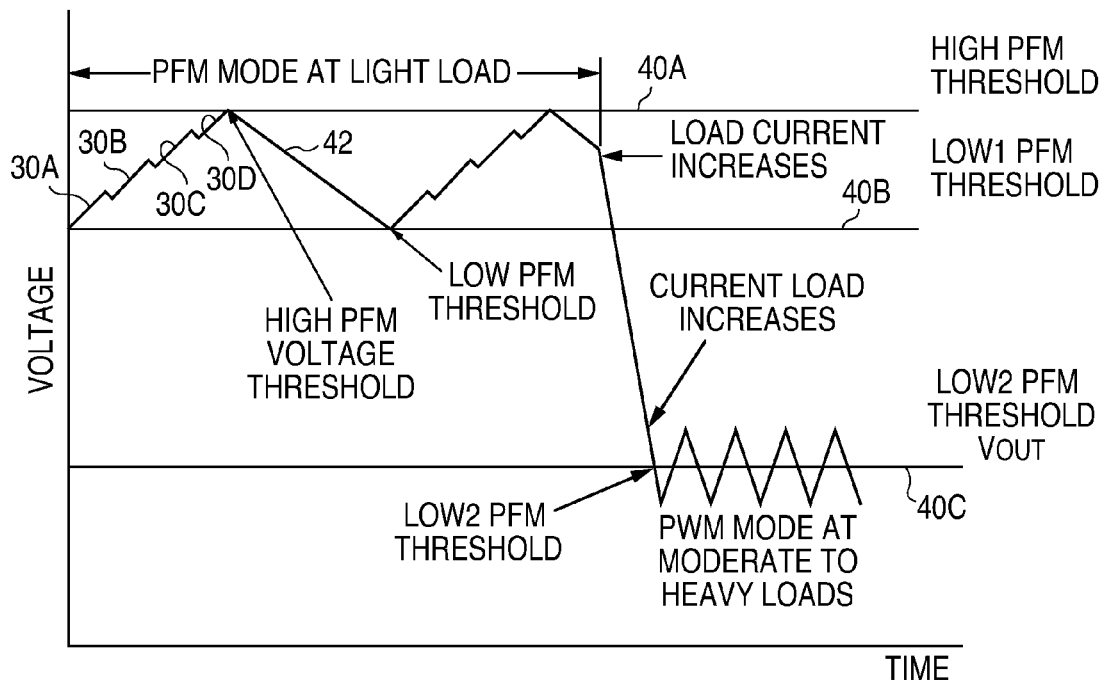
FIG. 4 is a timing diagram showing the output voltage of a prior art switching regulator switching from PFM to PWM.

As indicated by block 78, entry into the PFM mode is shown in the diagram of FIG. 10B. When entering the PFM, at least one current pulse is initially produced to facilitate PFM operation. As indicated by block 80, upon the rising edge of the low side N type transistor 24, the current sensor is initialized for PFM by setting the peak current limit to Ipeak. After the rising edge of the high side P transistor 22 is turned ON, the inductor current will rise until it reaches Ipeak, ignoring comparator offset and finite response times (element 82). The average current in the PFM mode is measured and if it is greater than Iave plus the hysteresis current (due to high value of K being used), a determination (element 88) is then made as to whether or not the output voltage Vout is exceeding Vmax (see upper limit 40A of FIG. 4).

If Vmax has not been reached, an additional current pulse is applied to the inductor by switching high side switch 22 ON and low side switch 24 OFF as indicated by block 92. This switching will continue until it is determined than the output voltage Vout has reached Vmax (element 88). At that point indicated by block 90, both the high side P transistor 22 and low side transistor 24 are turned OFF so that the load current is momentarily provided by the filter capacitor C1. This time period is indicated by numeral 42 if FIGS. 3A and 4. Eventually Vout will drop to the lower threshold voltage 40B (FIG. 3A). At that point, Vout will be driven back up to Vmax (element 88) by the application of additional current pulses as indicated by block 92.

Returning back to the FIG. 10A, while in the PFM mode, certain states are monitored to determine if the PFM mode is still appropriate. As indicated by element 76, three conditions are monitored and if any one is not met, switching to PWM should be carried out. First, if the output Voltage is too high, switching to PWM is appropriate. Second, if a few consecutive Vdet pulses are produced, the load current is too high so that the converter needs to switch to PWM. Finally, if the output voltage Vout differs from the target voltage Vt (see equation (14) above) by ±25 mV (or some other relatively small value), the current drive capabilities in the PFM mode are generally not as suitable for bringing the output voltage back in range as compared to PWM. If one or more of these conditions is present in the PFM mode, the converter switches at the appropriate time to PWM as indicated by block 77.

Thus, one embodiment of a buck converter mode control circuit has been disclosed. Although this embodiment has been described in some detail, it is to be understood that certain changes can be made by those skilled in the art without departing from the spirit and scope of the present invention as defined by the appended claims.

What is claimed is:

1. A buck switching voltage converter operable to convert an input voltage $V_{IN}$ from an input power source $V_{OUT}$ into a regulated output voltage, operable in a pulse width modulation (PWM) mode and a pulse frequency modulation (PFM) mode, and operable with an inductor having a switch node end and an output node end, the converter circuitry comprising:

high and low side switching transistors coupled to a switch node SW configured to couple to the switch node end of the inductor, the high side switching transistor configured to couple to the input power source and coupled to SW, and the low side switching transistor coupled between SW and a circuit common;

the high and low side switching transistors switchable, during PWM and PFM modes, by a switching controller based on switching cycles with an ON time during which the high side switching transistor is ON and the low side switching transistor is OFF, configuring the inductor to receive an inductor charging current that increases to a peak current, and an OFF time during which the high side switching transistor is OFF and the low side switching transistor is ON, configuring the inductor to provide an inductor discharging current that decreases until the end of the OFF time;

mode control circuitry for controlling transitioning between PWM and PFM switching modes, including:

current sensing circuitry configured to sense inductor current through the low side switching transistor during the OFF times of successive switching cycles to produce a current sense signal;

a sense integrator configured to integrate the current sense signal during each OFF time and to produce an integrated sense signal corresponding to inductor current;

a reference current integrator configured to integrate a reference current during each OFF time and to produce an integrated reference signal, the reference current corresponding to a predefined average inductor current $I_{AVE}$;

mode switching circuitry configured to switch between the PWM and PFM modes in response to the integrated sense signal and the integrated reference signal, according to a predefined mode switching condition corresponding to $[I_{VALLEY} = 2I_{AVE} - I_{PEAK}]$, where $I_{PEAK}$ is a detected peak inductor current at the beginning of the OFF time, and $I_{VALLEY}$ is an inductor current value determined by $I_{AVE}$ and $I_{PEAK}$.

2. The converter of claim 1, wherein the mode switching condition includes:

during PWM mode, signaling PWM detect when inductor current decreases below $I_{VALLEY}$, wherein switching from PWM mode to PFM mode is based at least in part on a predetermined number of successive PWM detect signals from a corresponding number of successive PWM switching cycles; and during PFM mode, the OFF time is terminated in response to the inductor current decreasing to $I_{VALLEY}$, wherein switching from PFM mode to PWM mode is based at least in part on detecting a predetermined number of successive PFM switching cycles in which an ON time is initiated immediately after an OFF time without skipping any PFM switching cycles.

3. The converter of claim 1, wherein the mode switching condition includes switching from PFM to PWM based at least in part on at least one of:

detecting $V_{OUT}$ greater than a predetermined maximum output voltage;

detecting that output voltage differs from the regulated $V_{OUT}$ by more than a predetermined voltage difference.

4. The converter of claim 1 wherein a sense voltage is developed across the low sides switching transistor when the transistor in switched ON and wherein the current sensing circuitry includes offset circuitry that provides an offset voltage added to the sense voltage to produce an offset sense voltage, with the offset sense voltage being used to produce the current sense signal.

5. The converter of claim 4 wherein the offset circuitry includes an offset transistor connected in series with the low side switching transistor, with the offset transistor being switched ON when the low side switching transistor is switched ON.

6. The converter of claim 5 where the low side switching transistor has an ON resistance of Rdson and where the offset transistor has an ON resistance of K*Rdson where K is a constant having a value of at least 5.

7. The converter of claim 6 where the offset circuitry includes an offset resistor connected in series with the offset transistor, with the offset sense voltage being produced at a terminal of the offset resistor.

8. The converter of claim 7 wherein the offset circuitry includes a first current source connected to conduct current through the offset resistor and the offset transistor, with the current flow through the offset resistor producing a resistor offset voltage.

9. The converter of claim 8 wherein the reference integrator produces a reference voltage related to the resistor offset voltage with the reference voltage being used to produce a reference current corresponding to the reference signal.

10. The converter of claim 9 wherein the current sense signal is a current and wherein the current sensing circuitry includes a first voltage-to-current converter which converts the offset sense voltage to the current sense signal and wherein the reference integrator includes a second voltage-to-current converter that converts the reference voltage to the reference current.

11. The converter of claim 10 wherein the reference integrator includes a reference resistor having a resistance which matches a resistance of the offset resistor and includes a second current source that matches the first current source.

12. The converter of claim 11 wherein the first and second current sources each have a current output related to a target inductor current level for switching between the PWM and PFM modes.

13. A method of controlling PWM and PFM switching of a buck switching voltage regulator operable in a pulse width modulation (PWM) mode and a pulse frequency modulation (PFM) mode for converting an input voltage $V_{IN}$ from an input power source into a regulated output voltage $V_{OUT}$, with the regulator including an inductor having a switch node end and an output node end, and including high and low side transistor switches coupled at a switch node SW to the switch node end of the inductor, the high side transistor switch coupled between the input power source and SW, and the low side transistor switch coupled between SW and a circuit common, said method comprising:
during PWM and PFM modes, controlling the high and low side switching transistors to switch based on switching cycles with an ON time during which the high side switching transistor is ON and the low side switching transistor is OFF, configuring the inductor to receive an inductor charging current that increases to a peak current, and an OFF time during which the high side switching transistor is OFF and the low side switching transistor is ON the configuring the inductor to provide an inductor discharging current that decreases until the end of the OFF time;
sensing inductor current through the low side transistor switch during OFF times of successive switching cycles to produce a current sense signal;
integrating the current sense signal during each OFF time to produce an integrated sense signal corresponding to inductor current;
integrating a reference current during each OFF time to produce an integrated reference signal, the reference current corresponding to a predefined average inductor current $I_{AVE}$; and
switching between the PWM and PFM operating modes in response to the sensed integrated signal and the reference integrated signal, according to a predefined mode switching condition corresponding to $[I_{VALLEY}=2I_{AVE}-I_{PEAK}]$, where $I_{PEAK}$ is a detected peak inductor current at the beginning of the OFF time and $I_{VALLEY}$ is an inductor current value determined by $I_{AVE}$ and $I_{PEAK}$.

14. The method of claim 13, wherein the current sense signal is a sense voltage, and further including the step of combining the sense voltage with an offset voltage to produce an offset sense voltage and wherein the sense voltage is related to the offset sense voltage.

15. The method of claim 14 wherein the offset voltage includes a first voltage component produced by passing a first current through a level shifting transistor switch having an ON resistance related to an ON resistance of the low side transistor switch.

16. The method of claim 15 wherein the offset voltage includes a second voltage component produced by passing the first current through a first resistance.

17. The method of claim 16, wherein the mode switching condition includes:
during PWM mode, signaling PWM detect when the inductor current decreases below $I_{VALLEY}$, wherein switching from PWM mode to PFM mode is based at least in part on a predetermined number of successive PWM detect signals from a corresponding number of successive PWM switching cycles; and
during PFM mode, the OFF time is terminated in response to inductor current decreasing to $I_{VALLEY}$, wherein switching from PFM mode to PWM mode is based at least in part on detecting a predetermined number of successive PFM switching cycles in which an ON time is initiated immediately after an OFF time without skipping any PFM switching cycles.

18. A buck switching voltage regulator operable to convert input voltage $V_{IN}$ from an input power source into regulated output voltage $V_{OUT}$, and capable of operating in a pulse width modulation (PWM) mode and a pulse frequency modulation (PFM) mode, the regulator comprising:
an inductor having a switch node end and an output node end;
high and low side switching transistors coupled to a switch node SW configured to couple to the switch node end of the inductor, the high side transistor switch coupled between the input power source and SW, and the low side switching transistor coupled between SW and a circuit common;
the high and low side switching transistors switchable, during PWM and PFM modes, by a switching controller based on switching cycles with an ON time during which the high side switching transistor is ON and the low side switching transistor is OFF, configuring the inductor to receive an inductor charging current that increases to a peak current, and an OFF time during which the high side switching transistor is OFF and the low side switching transistor is ON, configuring the inductor to provide an inductor discharging current that decreases until the end of the OFF time;

mode control circuitry for controlling transitioning between PWM and PFM switching modes, including:

current sensing circuitry configured to sense inductor current through the low sides switching transistor during the OFF times of successive switching cycles to produce a current sense signal;

a sense integrator configured to integrate the current sense signal over time starting when the second switching transistor is switched to an ON state and to produce an integrated sense signal;

a sense integrator configured to integrate the current sense signal during each OFF time and to produce an integrated sense signal corresponding to inductor current;

a reference current integrator configured to integrate a reference current during each OFF time and to produce an integrated reference signal, the reference current corresponding to a predefined average inductor current $I_{AVE}$; and mode switching circuitry configured to switch between the PWM and PFM modes in response to the integrated sense signal and the integrated reference signal, according to a predefined mode switching condition corresponding to $[I_{VALLEY}=2I_{AVE}-I_{PEAK}]$, where $I_{PEAK}$ is a detected peak inductor current at the beginning of the OFF time and $I_{VALLEY}$ is an inductor current value determined by $I_{AVE}$ and $I_{PEAK}$ and wherein the mode switching condition includes:

during PWM mode, signaling PWM detect when inductor current decreases below $I_{VALLEY}$, wherein switching from PWM mode to PFM mode is based at least in part on a predetermined number of successive PWM detect signals from a corresponding number of successive PWM switching cycles; and during PFM mode, the OFF time is terminated in response to the inductor current decreasing to $I_{VALLEY}$ wherein switching from PFM mode to PWM mode is based at least in part on the detection of a predetermined number of successive PFM switching cycles in which an ON time is initiated immediately after an OFF time without skipping any PFM switching cycles.

19. The regulator of claim 18 wherein the current sensing circuitry includes offset voltage circuitry to provide a first offset voltage which is combined with other voltages to produce the current sense signal and wherein the fixed reference signal is produced using a reference voltage related to the offset voltage.

20. The regulator of claim 19 wherein the first offset voltage and the reference voltage are produced using a current relating to a specified inductor current, with the specified inductor current being indicative of the inductor current level for switching between the operating modes.

21. The regulator of claim 20 wherein the offset voltage circuitry further provides a second offset voltage which is combined with the first offset voltage to produce the current sense signal, with the second offset voltage being produced across an offset transistor switch having an ON resistance related to an ON resistance of the low sides transistor switch.

* * * * *